O. A. KNOPP.
TIMING DEVICE.
APPLICATION FILED JAN. 11, 1912.

1,038,599.

Patented Sept. 17, 1912.

Witnesses:
John Enders
J. V. Curran.

Inventor:
Otto A. Knopp,
by Arba B. Marvin
Atty.

UNITED STATES PATENT OFFICE.

OTTO ALBRECHT KNOPP, OF OAKLAND, CALIFORNIA, ASSIGNOR TO PACIFIC GAS & ELECTRIC COMPANY, OF SAN FRANCISCO, CALIFORNIA, A CORPORATION OF CALIFORNIA.

TIMING DEVICE.

1,038,599. Specification of Letters Patent. Patented Sept. 17, 1912.

Application filed January 11, 1912. Serial No. 670,599.

*To all whom it may concern:*

Be it known that I, OTTO A. KNOPP, a subject of the Emperor of Germany, having declared my intention of becoming a citizen of the United States, residing at Oakland, in the county of Alameda, State of California, have invented new and useful Improvements in Timing Devices, of which the following is a specification.

It is the object of the present invention to provide a timing device calibrated in a special way and operative in a convenient manner to measure relatively short time intervals with accuracy. This timing device has special utility in the electrical arts.

In the electrical arts, there is need for a special timing device to be used in calibrating electric meters. To calibrate an electric recording meter and ascertain its correction factor or constant K, it is necessary to measure the time required by the disk of the meter to complete one, two or three revolutions with an applied load in watts of one, two or three hundred times the disk constant K of the meter. This time interval for a correct meter is one-hundredth of an hour. If the timing device is calibrated in decimals of an hour, the calibration constant of the electrical instrument under test may be read off directly from the timing device without the necessity for computations of any sort.

The details of the present invention will be better understood by reference to the following detailed description taken in conjunction with the accompanying drawings, wherein—

Figure 1:
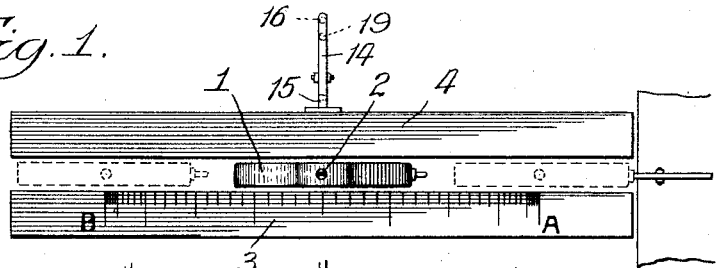
Figure 2:
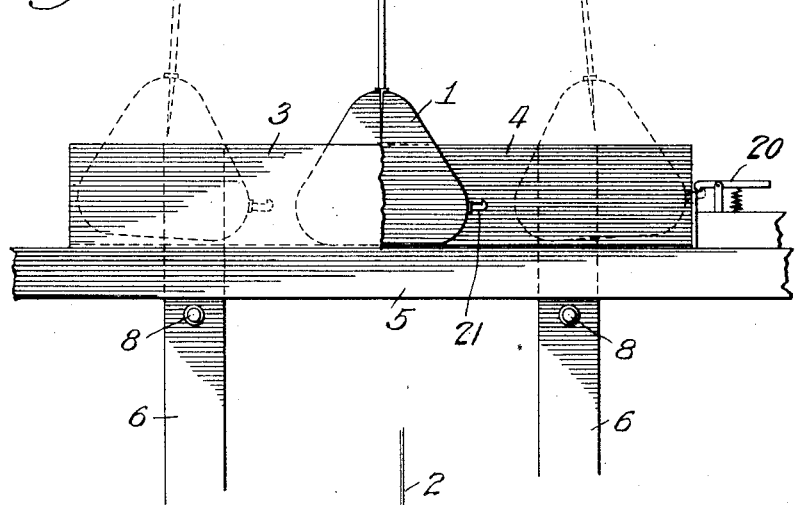
Figure 3:
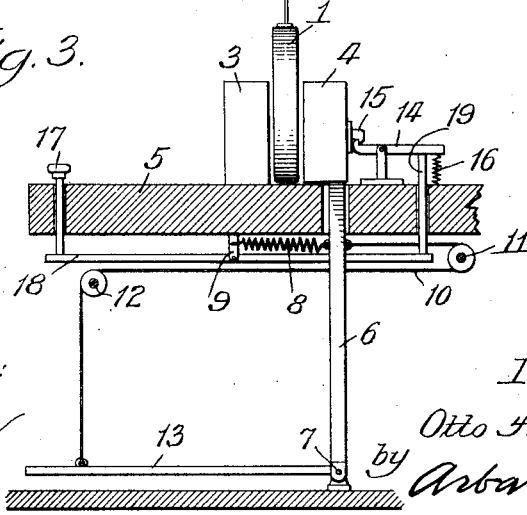

Figure 1 is a plan view of the timing device. Fig. 2 is a side elevation thereof showing the swinging pendulum in three different positions, the upper end of the pendulum being broken away. Fig. 3 is a side elevation, partly in section, showing the clamping mechanism for stopping the swing of the pendulum.

In the construction shown, a pendulum having a flat triangular weight 1 of approximately eight to nine pounds is suspended by a slender steel rod 2, something over ten feet long. The weight is free to swing back and forth between parallel jaws 3 and 4. The upper end of the steel rod 2 and its double jewel suspension, are of standard construction and for the sake of simplicity have been omitted from the drawings.

Jaw 3 is stationary on a table or support 5, but jaw 4 is movable toward the pendulum so that it can serve to clamp the weight 1 against jaw 3 when the pendulum is to be stopped. Jaw 4 is mounted on the upper end of a vertical arm 6 pivoted to the floor at 7. A coiled spring 8 secured to the front face of arm 6 and also secured to a bracket 9 beneath the table, tends to pull arm 6 and jaw 4 toward the pendulum. As a means for overcoming the tension of this spring and moving the jaw away from the pendulum, there is provided a rope 10 secured to the back face of the arm 6 and passing over sheaves 11 and 12 and then to foot treadle 13, suitably pivoted. When the operator pushes downward on treadle 13, he pulls the clamping jaw 4 away from the pendulum by a distance sufficient to allow free clearance for the pendulum between the two jaws. Jaw 4 can be permanently held in its withdrawn position by a latch 14 held in engagement with a hook 15 mounted on the back face of jaw 4. A coiled spring 16 under tension keeps the latch 14 in engagement with the hook.

A tripping mechanism for latch 14 is provided, comprising a push button 17, a horizontal lever 18 pivoted to bracket 9 and carrying at its rear end a vertical push rod 19 which engages with the rear end of latch 14. A downward push on the button 17 will release latch 14 and allow springs 8 to jerk jaw 4 forward, instantly gripping and holding the pendulum weight.

The upper face of jaw 3 is divided into a scale of five equal time intervals, between the reversing points A and B so that a double swing or complete cycle of the pendulum traverses a scale divided into ten parts of equal time intervals. A complete cycle or double swing is made in one millihour, so that each of these divisions represents 0.1 millihour and may be subdivided as shown in the drawings, into ten time intervals, each representing 0.01 millihour or 0.00001 hour. A holding means is provided for the pendulum comprising a spring-pressed latch 20 mounted on the table or support 5, and a hook 21 carried by the pendulum. Initially the pendulum is held in starting position by this catch and at the proper instant manual operation of the catch will release the pendulum and allow it to start on its swing.

When testing an electric recording meter by means of the stop pendulum above described, the pendulum is released at A just at the instant a marked portion of the meter disk passes a given point and the pendulum is allowed to swing until the meter disk has made the allotted number of revolutions in one one-hundredth of an hour, if the meter correction is zero. Consequently if the pendulum weight, when stopped, stands ten of the small scale divisions ahead of A, the correction factor of the meter under test is .99, because this is one one-hundredth of the complete time interval of ten cycles. If the pendulum weight stops ten of such sub-divisions behind A, the correction factor of the meter is 1.01. It will therefore be seen that results are given directly by the instrument, without the necessity for calculation or computation of any sort.

Although I have above described my invention as applied particularly to meter testing, it will be understood that it has other and broader applications and a more general utility. Also it can be changed in form and in detail, without departing from my invention, as defined by the appended claims.

What I claim as new and desire to secure by Letters Patent, is

1. A timing device comprising a pendulum, means for releasing said pendulum at the beginning of a time interval, and means for stopping the pendulum instantly at any point in its swing at the will of the operator.

2. In a timing device, a pendulum, a catch for holding said pendulum before it begins its swing, and jaws for engaging said pendulum to instantly stop the swinging movement thereof, at the will of the operator.

3. In a timing device, the combination of a pendulum, a manually operated releasing means for starting the swing of said pendulum, means for stopping the swing thereof instantly at the will of the operator, and a scale for indicating the position of the pendulum when stopped, the indication being in decimal parts of a millihour.

4. In a timing device, the combination of a pendulum normally swinging through a complete cycle in one millihour, a scale adjacent to said swinging pendulum and calibrated in decimal parts of a millihour, releasing means for starting the movement of said pendulum at the will of the operator, and clamping means for gripping the pendulum to ultimately stop its movement.

5. In a timing device, a pendulum, a jaw on either side of said pendulum, holding means which when released starts the movement of said pendulum, and manually controlled means for moving one of said jaws with respect to the other to instantly stop the swing of said pendulum, at the will of the operator.

6. In a timing device, the combination of a pendulum calibrated to swing through a complete cycle in one millihour, a scale adjacent to said swinging pendulum and calibrated in decimal parts of a millihour, a spring-pressed latch for releasing said pendulum at the beginning of a swing, a jaw on either side of the pendulum, one at least of said jaws being movable toward the other to grip the pendulum, a spring urging said jaws together, and a manually controlled latch initially holding said jaws apart, but operative to release the movable jaw and stop the swing of the pendulum, at the will of the operator.

In witness whereof, I hereunto subscribe my name to this specification in the presence of two witnesses.

OTTO ALBRECHT KNOPP.

Witnesses:
W. G. SCHMIDT,
GEO. WAGNER.

Copies of this patent may be obtained for five cents each, by addressing the "Commissioner of Patents, Washington, D. C."